United States Patent [19]
Heller et al.

[11] Patent Number: 6,099,931
[45] Date of Patent: Aug. 8, 2000

[54] INSULATION SYSTEM

[75] Inventors: Peter Heller; Reiner Buck, both of Stuttgart, Germany

[73] Assignee: Deutsches Zentrum fuer Luft-und Raumfahrt e.V., Bonn, Germany

[21] Appl. No.: 09/050,478

[22] Filed: Mar. 30, 1998

[30] Foreign Application Priority Data

Apr. 2, 1997 [DE] Germany ............................ 197 13 598

[51] Int. Cl.$^7$ .................................. B32B 3/10; F24J 2/46
[52] U.S. Cl. ............................ 428/68; 126/648; 126/654; 126/667; 126/669; 126/671; 126/707; 428/74; 428/131; 428/137; 428/138; 428/181
[58] Field of Search ................................. 126/648, 649, 126/650, 653, 654, 655, 663, 664, 665, 667, 668, 669, 671, 672, 680, 709; 428/181, 182, 183, 184, 68, 131, 137, 138, 74

[56] References Cited

U.S. PATENT DOCUMENTS

| | | | |
|---|---|---|---|
| 4,083,180 | 4/1978 | Thompson et al. | 60/39.16 R |
| 4,300,349 | 11/1981 | Heckel | 60/39.51 R |
| 4,301,787 | 11/1981 | Rice | 126/429 |
| 5,421,322 | 6/1995 | Karni et al. | 126/680 |
| 5,667,875 | 9/1997 | Usui | 428/182 |
| 5,673,521 | 10/1997 | Coulton et al. | 52/199 |

FOREIGN PATENT DOCUMENTS

| | | |
|---|---|---|
| 28 42 410 | 4/1980 | Germany . |
| 34 46 649 | 6/1986 | Germany . |

*Primary Examiner*—Nasser Ahmad
*Assistant Examiner*—Derek Jessen
*Attorney, Agent, or Firm*—Barry R. Lipsitz; Ralph F. Hoppin; Douglas M. McAllister

[57] ABSTRACT

In order to provide an insulation system for internal thermal insulation of a pressure chamber which can be subjected to pressure by a gas flow, the system being constructed for arrangement at an inner surface of an outer jacket of the pressure chamber and comprising at least one layer of insulating material, whereby good thermal insulation can be obtained with little maintenance work, it is proposed that the insulation system should comprise means for equalizing pressure between the insulating material and an internal chamber, which means are arranged over a large area relative to a surface of a layer of insulating material.

38 Claims, 4 Drawing Sheets

INSULATION SYSTEM

BACKGROUND OF THE INVENTION

The invention relates to an insulation system for internal thermal insulation of a pressure chamber which can be pressurized or subjected to pressure by a gas flow, the system being constructed for arrangement at an inner surface of an outer jacket of the pressure chamber and comprising at least one layer of insulating material.

It further relates to a method of internal thermal insulation of a pressure chamber which can be pressurized or subjected to pressure by a gas flow, comprising an insulation system constructed for arrangement at an inner surface of an outer jacket of the pressure chamber and comprising one or more layers of insulating material.

Insulation systems and methods of this type are used particularly for thermal insulation of pressurized volumetric solar radiation receivers, in which a gas absorbs heat from concentrated solar radiation in an absorber and the heated gas is drawn off. As the insulation systems used are not generally of gas-tight construction pressure equalization or balancing takes place during operation, i.e. pores of the insulating material are filled with the gaseous medium of the gas flow applied to the material until the pressure in the insulation system is equal to that of the surrounding gaseous medium. Since the inoperative state of such a receiver is usually a depressurized state, pressure equalization takes place particularly when an installation including the receiver is started or shut down. When the installation is shut down the pressure in the insulating material drops and a gas flow passes out of the insulation system, whereby particles may be entrained from the material. A quartz window through which solar radiation passes into the receiver may in particular be fouled in the process. The window is consequently exposed to excessive absorption, which may cause degradation of the window material. This leads to a great deal of cleaning and maintenance work on the receiver.

SUMMARY OF THE INVENTION

The object of the present invention is therefore to provide an insulation system of the above type which enables good thermal insulation to be obtained with little maintenance work.

This object is achieved by the insulation system with the above-mentioned features, in that the insulation system comprises means for equalizing pressure between the insulating material and an internal chamber, which means are arranged over a large area relative to a surface of a layer of insulating material.

The insulation system according to the invention has the advantage that the arrangement of pressure-equalizing means over a large area greatly reduces the speed of a pressure-equalizing gas flow when impacting the insulating material. Tearing away and entrainment of particles of insulating material are thereby avoided and hence contamination of the pressure chamber with eroded insulating material is largely prevented.

A serious drawback of previous apparatus and methods known from prior art is that, with very rapid pressure reduction, pressure equalization through ventilation holes in a cover of the insulating material cannot take place fast enough. When the pressure changes there is therefore a pressure difference between the surrounding gaseous medium and the insulating material, leading to exertion of force on the cover. This may result in failure of the corresponding components through excessive bulging. Since the insulating material in the system according to the invention may be pressurized over a large area and pressure changes occur very quickly, a pressure difference cannot build up between the gaseous medium of the gas flow and the insulating material. The force exerted on corresponding components of the system is therefore minimized, thus particularly lengthening the life of the system.

In the insulation system according to the invention pressure differences cannot build up when the pressure changes, and the forces acting on the system are therefore weak, so the strength requirements for a supporting structure or covers of the system are reduced. Hence the system can be made with a lower weight than apparatus known from prior art. It can thus be applied universally and produced in a more cost-effective manner.

In an advantageous version of an embodiment the pressure-equalizing means are arranged so that substantially the whole surface of the layer of insulating material can be impinged upon by a pressure-equalizing gas flow. This firstly enables the pressure to be equalized rapidly without excessive exertion of force on the cover, and secondly minimizes the flow speed of the pressure-equalizing gas flow.

In a structurally particularly simple version of an embodiment the pressure-equalizing gas flow is part of the gas flow which can impinge upon the pressure chamber.

The insulation system advantageously has a supporting structure for holding the system in the pressure chamber, so that the insulating system can easily be mounted in the internal chamber.

In one version of an embodiment the pressure-equalizing means are arranged relative to a surface of a layer of insulating material facing towards an inner surface of the outer jacket of the pressure chamber. In this way the pressure-equalizing gas flow can be formed by a cold flow which is fed in and drawn off at a cold side of the insulation system.

In another version of an embodiment the pressure-equalizing means are arranged relative to a surface of a layer of insulating material facing away from the inner surface of the outer jacket of the pressure chamber. Pressure equalization by means of the gas flow then takes place at a hot gas side of the system, facing towards the internal chamber.

No statements have yet been made about the structure of the pressure-equalizing means. In the version of an embodiment where pressure equalization takes place at the hot gas side of the insulation system, the pressure-equalizing means in a version of an embodiment are formed by the supporting structure which holds the insulation system in the pressure chamber. The constructional outlay is reduced in this way.

The insulating material can then be impinged upon by or exposed or subjected to the pressure-equalizing gas flow in a simple manner, in that the supporting structure contains a plurality of holes. The structure thereby has the requisite stability to hold the insulation system while at the same time allowing pressure equalization.

In a structurally simple embodiment the supporting structure is formed by one or more perforated sheets.

It is advantageous to have a flexible intermediate layer to compensate for expansion arranged between the insulating material and the supporting structure. Superficial abrasion, caused by relative movements between a ceramic insulation and a metallic supporting structure owing to different coefficients of expansion, can thus be avoided.

In one version of an embodiment the flexible intermediate layer is formed by a ceramic felt.

In the version of an embodiment where the pressure-equalizing gas flow takes place at the cold side of the insulation system, the pressure-equalizing means preferably include a structure containing a plurality of holes for feeding the pressure-equalizing gas flow to the insulating material. In a constructionally simple manner, such a structure may be arranged over a large area relative to the surface of the layer of insulating material facing towards the inner surface of the outer jacket of the pressure chamber, in order to allow exposure of the insulating material over a large area.

In a structurally particularly simple embodiment the structure is formed by one or more perforated sheets.

The supporting structure for holding the insulation system is advantageously arranged facing towards the internal chamber. In a particularly advantageous embodiment the supporting structure is in the form of a gas-tight jacket for the insulation system. The pressure-equalizing gas flow is then fed in and drawn off in controlled manner through a surface of the insulating material at the pressure chamber wall side.

The supporting structure advantageously has means for compensating for heat expansion, so that imperviousness to gas is ensured. The expansion-compensating means may comprise compensating bellows or crimps.

In order to obtain uniform pressurization of the insulating material it is particularly advantageous for the pressure-equalizing means to comprise a flow channel for feeding the pressure-equalizing gas flow to/away from the structure, so that the structure and thus also the insulating material can be provided with the gas flow over a large area.

In a particularly advantageous embodiment of the insulation system according to the invention, a filter to retain particles of insulating material is arranged between the pressure-equalizing means and the surface of the layer of insulating material. In this way eroded insulating material can be retained and contamination of the internal chamber by powdered insulating material largely avoided. For this purpose the filter is advantageously constructed so that a mesh size of the filter is adapted to the particle size in the insulating material, in order to retain insulating material powder or dust as far as possible.

In the version of an embodiment where the pressure-equalizing gas flow is fed in and drawn off on a surface of the insulation system at the chamber wall side, the filter may be produced particularly cost-effectively from a low-temperature material such as paper or plastics material.

In the version of an embodiment where the pressure-equalizing gas flow takes place over the hot gas side of the insulation system, the filter is beneficially made of a material resistant to high temperatures.

No statements have yet been made about the insulating material. The insulation system advantageously comprises at least one layer of microporous material as insulating material. Such material has very good heat insulation properties and ensures good pressure equalization between the internal chamber and the insulation system.

The microporous material is beneficially arranged between two fibre mats, which in particular are flexible in order to obtain a good fit between the insulation system and the inner surface of the pressure chamber.

In a particularly advantageous version of an embodiment the pressure-equalizing means are connected to an outlet passage of the gas flow to which the pressure chamber can be exposed. A filter of large area for retaining particles of insulating material is not necessary in this version, as a pressure-equalizing gas flow which is drawn off is fed directly to the outlet and hence cannot contaminate the internal chamber.

A filter for retaining particles of insulating material is advantageously arranged at a connection between the pressure-equalizing means and the outlet passage, in order to keep the eroded insulating material at a low concentration in the outlet flow.

An inlet passage for the gas flow into the pressure chamber beneficially has one or more branches for a part-flow of the gas flow, in order to subject the pressure-equalizing means to pressure. Thus a part-flow can branch off from the gas flow on entering the internal chamber and can be used to adjust the pressure equalization.

In one version of an embodiment the insulation system may be built up from individual insulation modules or cassettes. This allows variable build-up and use of the insulation system according to the invention and particularly a high degree of adaptability.

In order to prevent air from leaking through a gap where adjacent insulation modules abut each other, the gap may be provided with a cover. Thus the insulation modules according to the invention may be used in the same way as if the system were assembled integrally.

It is particularly advantageous for the insulation system according to the invention to be used in a volumetric radiation receiver, particularly a solar radiation receiver.

The invention also has the object to provide a method with the above-mentioned features, allowing effective pressure equalization to be obtained with good heat insulation.

According to the invention the object is achieved, in that a pressure-equalizing gas flow, for equalizing pressure between the insulation material and an internal chamber, is passed over a surface of a layer of insulating material over a large area.

The method according to the invention has the advantages already described in connection with the apparatus according to the invention.

Preferred embodiments of the method of the invention are the subject of claims 33 to 36. Their advantages have also already been discussed in connection with the apparatus of the invention.

DETAILED DESCRIPTION OF THE INVENTION

Figure 1:
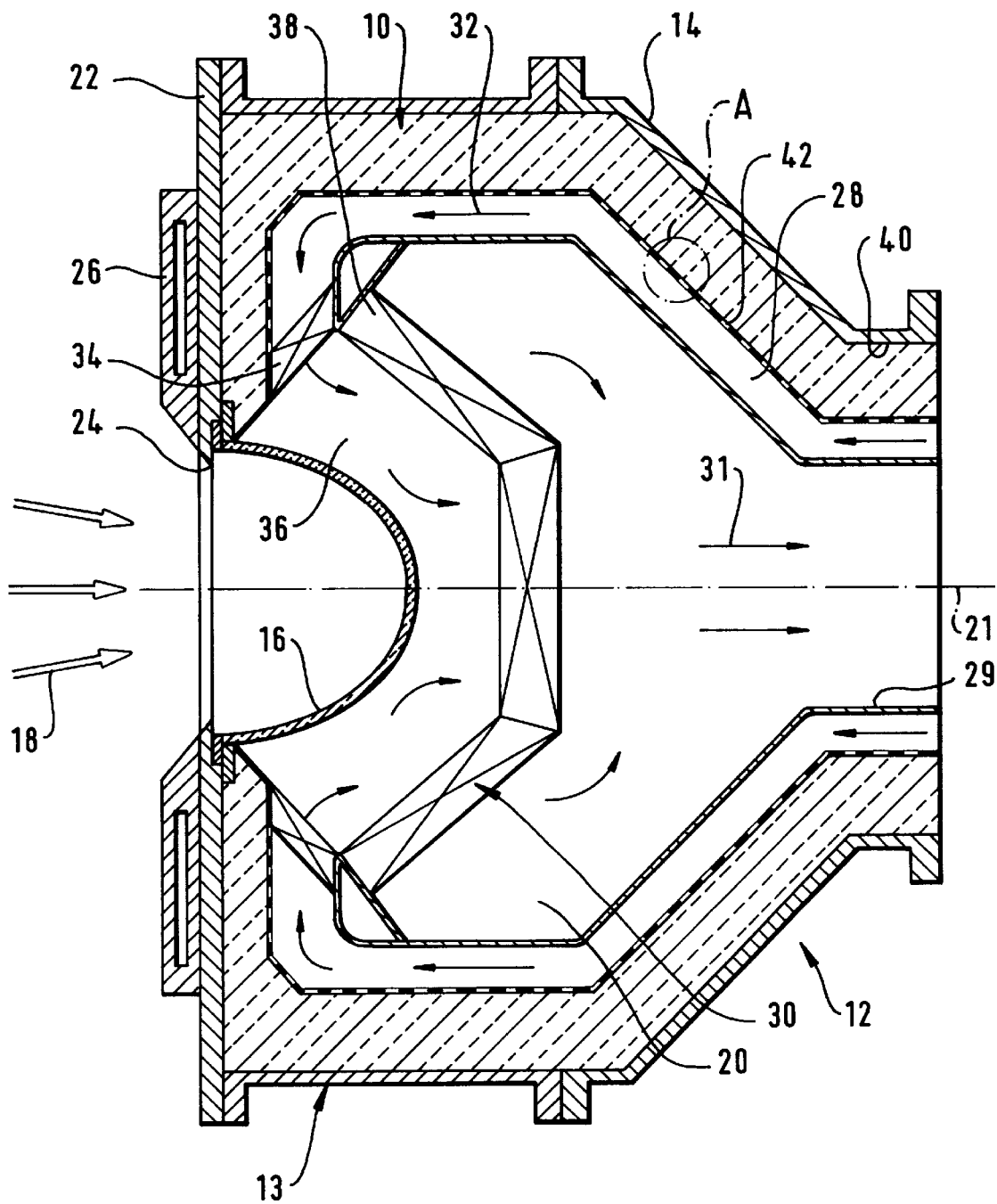
FIG. 1 is a diagrammatic representation of a solar receiver with an embodiment of an insulation system according to the invention.

In an embodiment of the insulation system according to the invention, referred to generally as 10 in FIG. 1, the function of the system is internal thermal insulation of a volumetric solar radiation receiver 12. The receiver has a pressure-resistant pressure chamber 13 with an outer jacket 14.

An entry window 16, through which concentrated solar radiation 18 can enter an internal chamber 20 of the solar radiation receiver 12, is seated in a wall surface of the outer jacket 14. The window 16, which is made particularly of quartz glass, is dome-shaped in order to reduce mechanical loads due to the internal pressure in the internal chamber 20 and heating, and also to reduce reflection of radiation by the window 16. It is symmetrical relative to an axis of symmetry 21 of the receiver 12.

A wall 22 of the outer jacket 14, upon which concentrated solar radiation 18 can impinge, is protected around an opening 24 for the entry window 16 by mask or screen 26 which is preferably water-cooled.

A volumetric absorber 30 is arranged in the internal chamber 20, facing towards the entry window 16; it can absorb heat when a gas flow 32, particularly an air flow, passes through it.

For this purpose the gas flow 32 is taken along a flow channel 28, which is connected to an inlet (not shown) for the gas flow in the pressure chamber 13. The flow channel 28 is formed between an inner jacket 29 and the insulation system 10.

The gas flow 32 is taken through an inlet absorber 34 of the volumetric absorber 30, an absorber chamber 36 formed between the entry window 16 and the absorber 30, and an outlet absorber 38 of the absorber 30. An outlet flow 31 is carried in the part of the internal chamber 20 against the inner jacket 29, and this heated gas flow is fed to an outlet (not shown) of the pressure chamber 13.

The internal chamber 20 is under a pressure of e.g. approximately 3 to 15 bars according to the design of the pressure chamber 13.

The insulation system 10 according to the invention is arranged between the flow channel 28 and an internal surface 40 of the outer jacket 14 of the pressure chamber 13. It preferably covers the whole internal surface 40 of the pressure chamber, apart from the area formed by the opening 24 for the entry window 16 and the areas for the inlet and outlet of the gas flow.

The insulation system 10 is held in the internal chamber 20 by means of a supporting structure 42.

Figure 2:
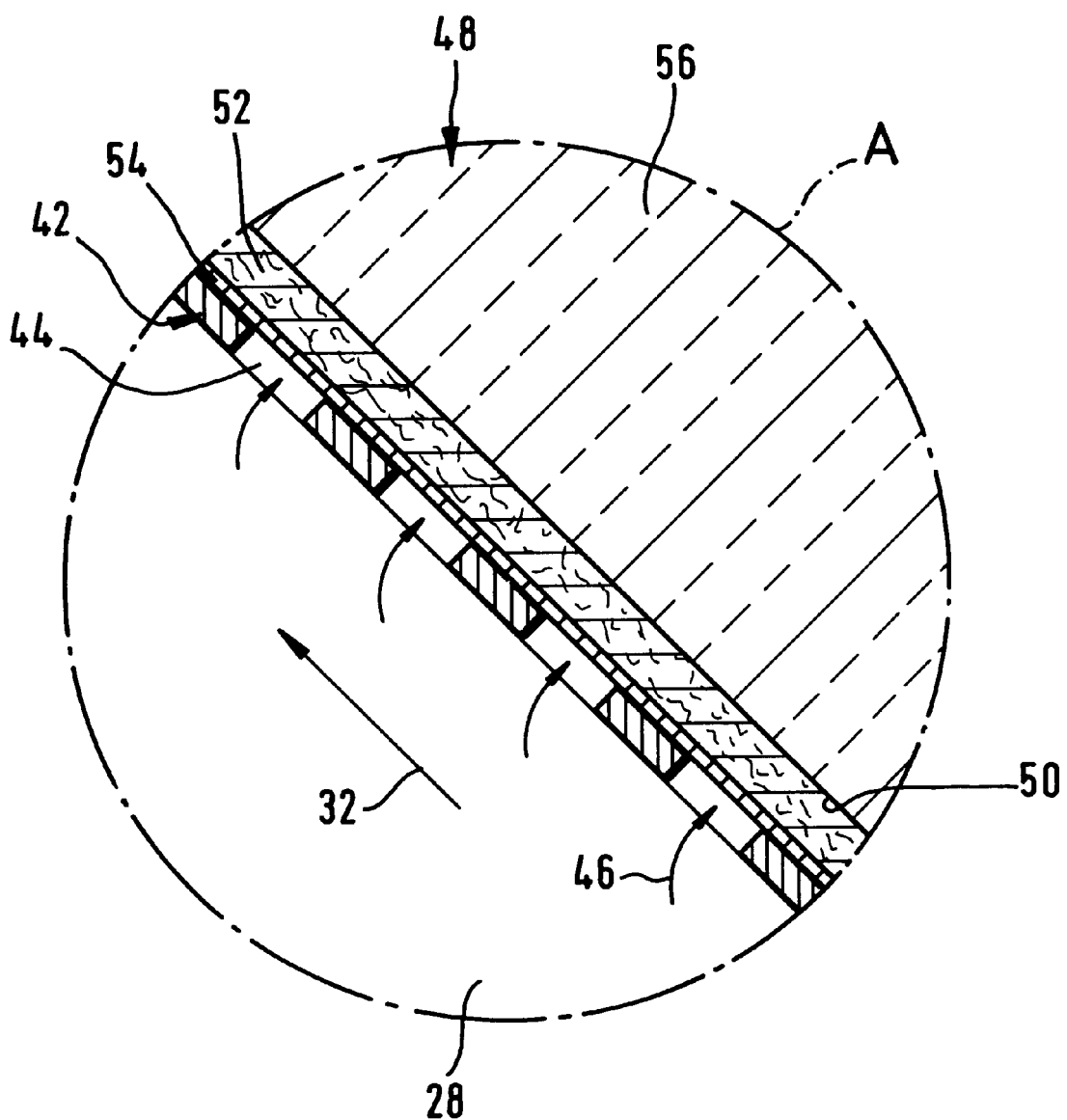
FIG. 2 is a diagrammatic representation of the detail A in FIG. 1.

In a version of an embodiment shown in FIG. 2 the supporting structure 42, which may particularly be in the form of a perforated sheet, contains a plurality of holes 44 through which a pressure-equalizing gas flow 46, part of the gas flow 32, may be fed to a layer of insulating material 48 belonging to the insulation system 10.

The holes 44 are arranged in a large area over the supporting structure 42, so that an entire surface 50 of insulation material facing towards the internal chamber 20 can be exposed to the pressure-equalizing gas flow 46 in order to equalize the pressure with the chamber 20.

A flexible intermediate layer 52 to compensate for expansion is arranged between the surface 50 of the insulation material and the supporting structure 42. It is preferably constructed so that it also has an insulating action. For example it may be made of ceramic wool.

A filter 54 is arranged between the flexible intermediate layer 52 and the supporting structure 42, to hold back particles of insulating material from the layer 48 of insulating material or the intermediate layer 52. For this purpose a mesh size of the filter 54 is adapted to the particle size of the insulation material in the layer 48 and the flexible intermediate layer 52.

The filter 54, which faces towards the internal chamber 20 in the version of an embodiment in FIG. 2, is made of a material resistant to high temperatures, such as a metal or a ceramic material, and may e.g. be a fabric or a felt.

In a version of an embodiment of the insulation system according to the invention (not shown in the Figure) the filter itself forms the supporting structure which holds the system in the pressure chamber 13.

The insulation system according to the invention operates as follows:

The part-flow 46 of the gas flow 32, acting as a pressure-equalizing gas flow, impinges upon the surface 50 of the insulating material over a large area. Substantially the whole surface is impinged upon. The speed of the part-flow 46, which passes into and out of the insulating material 56 of the layer 46 as a result of pressure changes in that material, consequently drops far below the speed of the gas flow 32. This substantially prevents particles of insulating material from whirling up and being entrained, and pressure equalization between the insulation system 10 and the internal chamber 20 is ensured.

The filter 54 also prevents particles of insulating material from being entrained into the internal chamber 20. If the pressure in the internal chamber 20 is reduced, e.g. by turning off the gas flow 32, a higher pressure prevails briefly in the insulation system 10, as it has a delayed reaction to the pressure drop in the chamber 20. There is consequently a gas flow out of the insulation system into the internal chamber 20 when the pressure drops. The filter 54 again prevents insulating particles from passing into the chamber 20, which they might foul.

As a result of the drawing out over a large area at the correspondingly reduced flow speeds, even a brief pressure difference over the supporting structure 42 remains very small in a pressure equalizing process. This considerably reduces the strength requirements for the supporting structure 42, which are substantially determined by these pressure differences on the basis of the forces produced thereby.

The insulation system according to the invention thus allows pressure equalization when there is either a pressure rise or a pressure drop in the interior 10 of the pressure vessel 13; contamination of the internal chamber 20 by particles of insulating material is prevented and deformation of the supporting structure 42 avoided.

In a second version of an embodiment (FIG. 3) the insulation system 10 is held in the pressure vessel 13 by means of a supporting structure 58 which is impervious to gas. The supporting structure has means 60 to compensate for axial expansion and radial expansion relative to the axis of symmetry 21. The means provided are in particular compensation bellows and/or pleats, corrugations or crimps.

Figure 3:
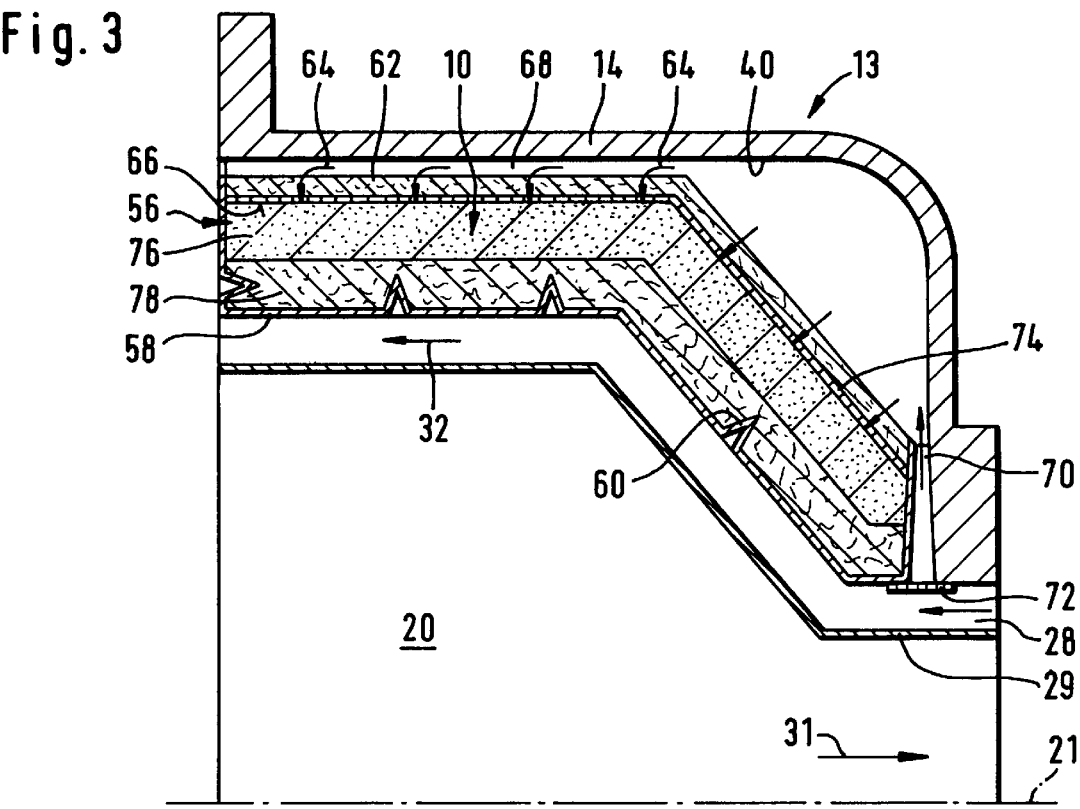
FIG. 3 is a diagrammatic representation of a version of an embodiment of the insulation system according to the invention.

The insulation system 10 comprises a structure 62 facing towards the inner surface 40 of the outer jacket 14 of the pressure chamber 13; the structure contains a plurality of holes through which the insulation material 56 can be exposed to a pressure-equalizing gas flow 64. The holes in the structure 62 are arranged over a large area in respect of a surface 66 of the insulating material facing towards the inner surface 40 of the outer jacket 14. A flow channel 68 is formed between the structure 62 and the inner surface 40, so that gas can flow to the whole surface of the structure. In a version of an embodiment, as shown in FIG. 3, the flow channel 68 is connected to the flow channel 28 for the gas flow 32 by a ventilation hole 70, so that the pressure-equalizing gas flow 64 can be formed by a part-flow of the gas flow 32. A filter 72 is preferably arranged at the ventilation hole 70 to prevent particles of insulating material from penetrating into the internal chamber 20.

A filter 74 for retaining particles of insulating material is arranged over a large area between the structure 62 and the surface 66 of the insulating material. As the pressure-equalizing gas flow 64 is a cold flow which is fed to the insulation system 10 at a cold side, a low-temperature material such as paper or plastics material may be used for the filter 74.

In a version of an embodiment shown in FIG. 3 the insulating material comprises a first layer 76 made e.g. of a microporous material, and a second layer 78 arranged between the first layer and the gas-tight supporting structure 58 and made e.g. of a flexible ceramic wool.

In the second embodiment (FIG. 3) the insulation system according to the invention operates basically as described above. However the pressure-equalizing gas flow 64 is fed in and carried away via a cold side of the system 10, and the surface of the system facing towards the internal chamber 20 is hermetically sealed off from the chamber 20 by the supporting structure 58.

When the pressure in the internal chamber 20 rises, a gas flow, part of the gas flow 32 in the flow channel 28, passes through the ventilation hole 70 into the flow channel 68 between the structure 62 and the insulating material 56. This part-flow acts as a pressure-equalizing flow 64, which is fed to the insulating material over a large area through the holes in the structure 62.

Figure 6A:
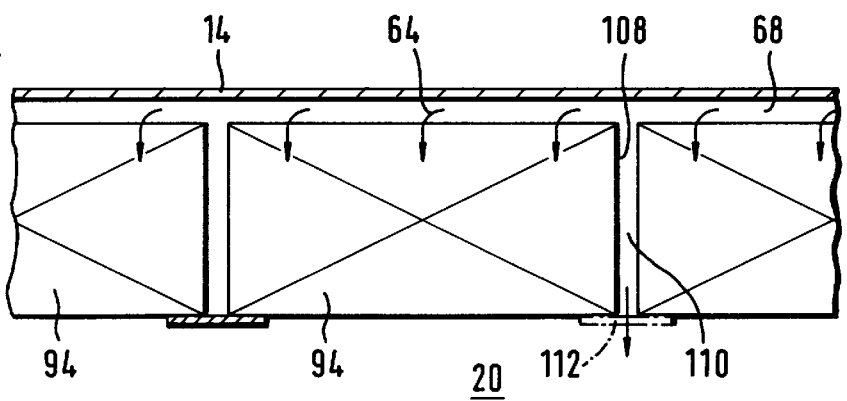
FIGS. 6a,b show pressure-equalizing gas flows in the method of the invention.
Figure 6B:
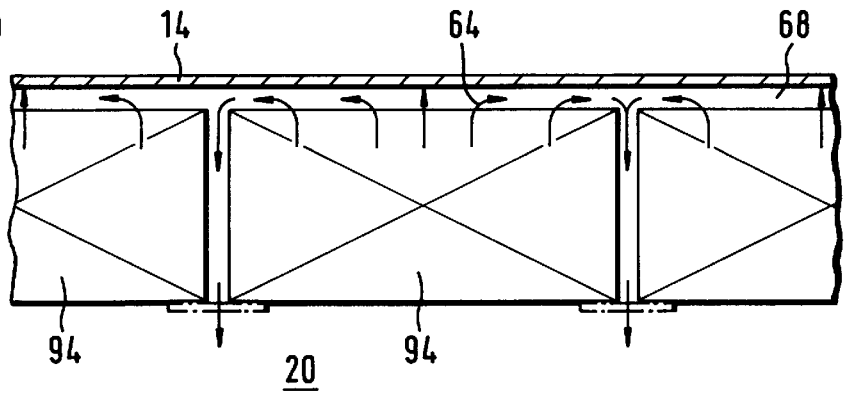

When the pressure drops, a gas flow from the insulating material can flow away or escape through the flow channel 28 (see also FIG. 6b).

The fact that the insulating material 56 is exposed to the pressure-equalizing gas flow 64 over a large area ensures that little dust is developed in the insulating material through erosion by the gas flow 64. The filter 74 prevents such eroded particles from entering the flow channel 68, and the filter 72 additionally prevents any eroded particles which may have gone into the channel 68 from entering the internal chamber 20. Contamination of the internal chamber 20 with eroded particles and in particular fouling of the entry window 16 of the solar radiation receiver 12 are thereby avoided.

Figure 4:
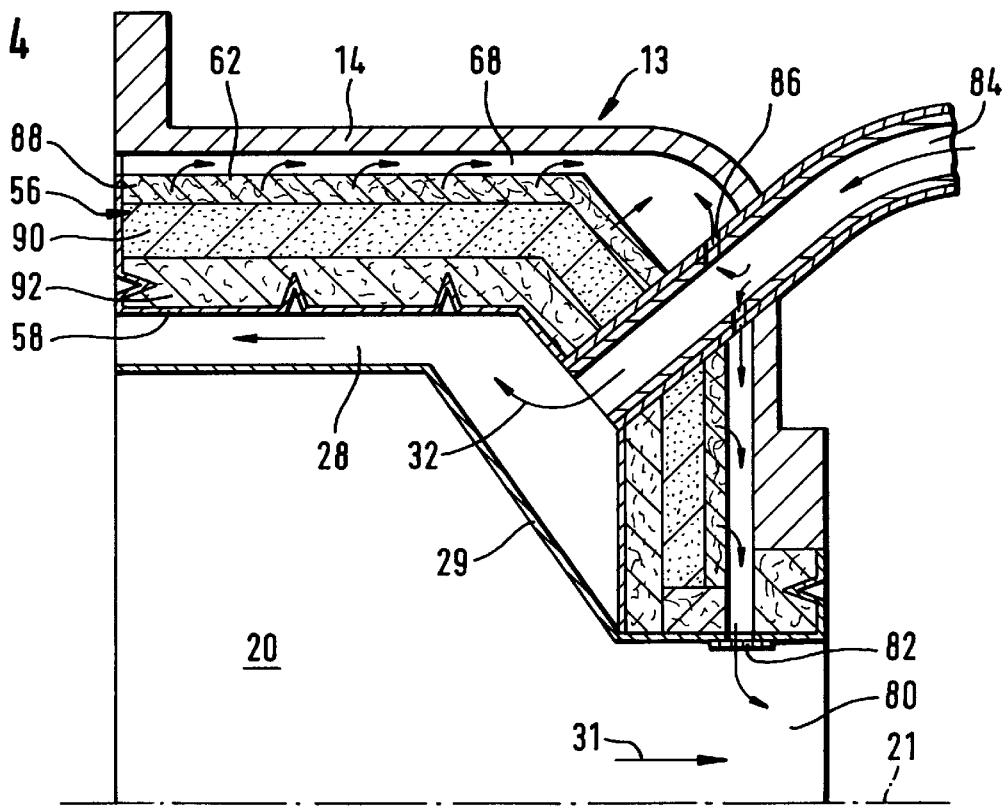
FIG. 4 is another version of an embodiment of the insulation system according to the invention.

In a third version of an embodiment shown in FIG. 4, which is basically of the same construction as the FIG. 3 embodiment, the flow channel 58 leads into an outlet passage 80 for the gas flow 31, by means of which the gas flow heated in the solar radiation receiver 12 is drawn off to the outlet. A filter 82 is located at the place where the flow channel 68 leads into the outlet passage 80.

In one version of an embodiment an inlet passage 84 for the gas flow 32 into the pressure chamber 13 leads into the flow channel 28. The inlet passage 84 contains ventilation holes 86, through which part of the gas flow 32 from the inlet passage 84 can be guided into the flow passage 68. The holes 86 are constructed so that they only let the gas flow towards the inlet passage 84 to the flow channel 68 but not in the opposite direction.

In accordance with the invention, instead of the part-flow branching off from the inlet passage 84, provision may be made for it to branch off through the outlet passage 80, i.e. for the gas flow in the channel 28 to be fed both in and out along that passage.

In the version of an embodiment shown in FIG. 4 the insulating material comprises a first layer 88 facing towards the structure 62, a second layer 90 and a third layer 92 facing towards the gas-tight supporting structure 58. The first layer 88 and third layer 92 are preferably formed by flexible fibre mats, e.g. ceramic fibre mats, and the second layer 90 by a microporous material.

In the FIG. 4 embodiment there is no filter between the first layer 88 and the structure 62, as contamination of the internal chamber 20 with eroded insulating material is prevented by drawing off a gas flow into the outlet passage 80 especially when the pressure drops.

Figure 5:
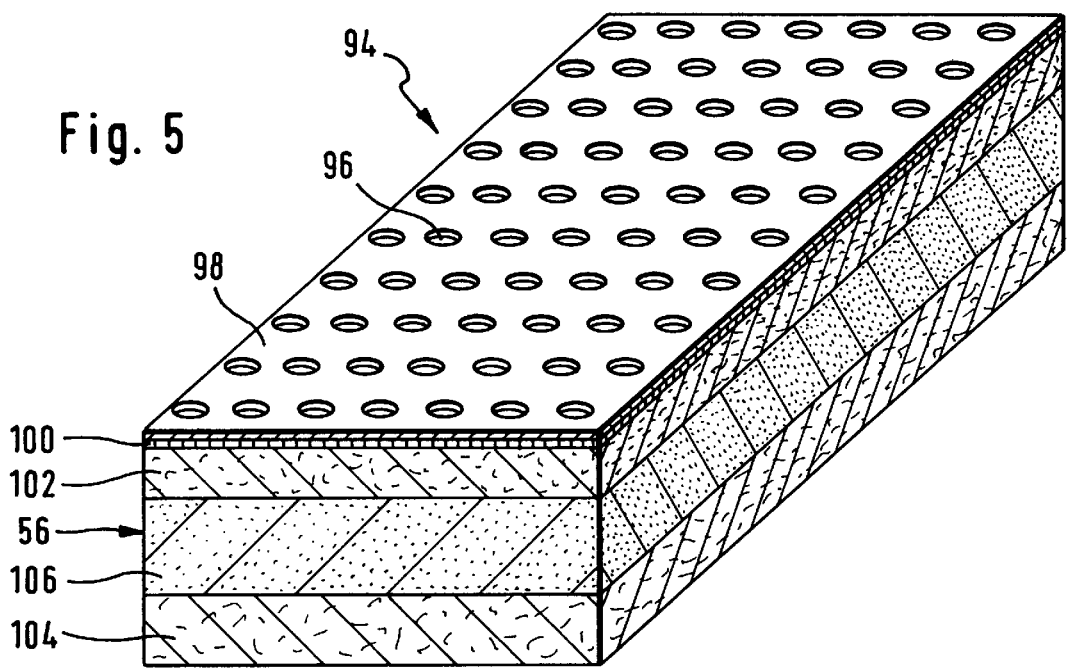
FIG. 5 is an embodiment of an insulation module according to the invention.

The insulation system may be an integral one or may be created by juxtaposing individual insulation modules 94 (FIG. 5).

As shown in FIG. 5, an insulation module 94 comprises a perforated sheet 98 containing a plurality of holes 96 and enabling the insulating material 56 to be exposed to the pressure-equalizing gas flow 46 or 64. A filter 100 is arranged between the sheet 98 and the insulating material 56 to retain eroded particles of the material. It is joined to the sheet 98 in gas-tight manner especially at the edge. The other covers of the insulating material (side walls, front and rear wall) are also hermetically sealed so as not to allow an additional, uncontrollable gas flow. In a version of an embodiment the filter 100 is held between two perforated sheets (not shown).

In a version of an embodiment the insulating material 56 in an insulation module 94 comprises a first ceramic felt insert 102 and a second ceramic felt insert 104. A layer 106 of highly insulating ceramic is arranged between the first and second inserts.

The insulation system may be formed by assembling such individual modules 94. For this purpose the modules 94 may, for example, be inserted in the gas-tight structure 58. A gap 110 is formed at a joint 108 between adjacent modules 94, through which a gas flow may leak when the insulating material 56 is exposed to a gas flow (FIGS. 6a, 6b). In order to prevent this covers 112, facing e.g. towards the internal chamber 20, are provided to cover the gap 110.

It may be desirable for gas to be drawn off through a gap 110, e.g. to enable the pressure to be equalized more rapidly. In this version the covers 112 are then omitted.

The insulation system according to the invention, made up of individual insulation modules 94, operates basically as described above. In a version of an embodiment with the pressure-equalizing gas flow 64 passing through the flow passage 68, this flow goes to the modules 94 and thus the insulating material 56 when the pressure rises (FIG. 6a). The flow 64 is drawn off through the channel 68 when the pressure drops (FIG. 6b). Gas may be allowed to flow out through the gap 110 by removing the covers 112.

What is claimed is:

1. A thermal insulation system in combination with a pressure chamber that has an entry window for radiation and is subject to pressure by a gas flow, and the combination comprises:

at least one layer of insulating material arranged at an inner surface of an outer jacket of the pressure chamber;

means for equalizing pressure between the insulating material and an internal chamber;

wherein said means are arranged over a major area relative to a surface of a layer of the insulating material; and a filter to retain particles of insulating material;

wherein:

said filter is arranged between said pressure-equalizing means and the surface of said layer of insulating material; and a mesh size of said filter is adapted to the particle size in the insulating material.

2. The insulation system of claim 1, wherein:

the pressure-equalizing means are arranged so that substantially the whole surface of the layer of insulating material is exposed to a pressure-equalizing gas flow.

3. The insulation system of claim 1, wherein:

a pressure-equalizing gas flow is part of the gas flow to which the pressure chamber is subjected.

4. The insulation system of claim 1, further comprising:

a supporting structure which holds the insulating system in the pressure chamber.

5. The insulation system of claim 1, wherein:

the pressure-equalizing means are arranged relative to a surface of the layer of insulating material that faces towards an inner surface of the outer jacket of the pressure chamber.

6. The insulation system of claim 1, wherein:

the pressure-equalizing means are arranged relative to a surface of the layer of insulating material that faces away from the inner surface of the outer jacket of the pressure chamber.

7. The insulation system of claim 6, further comprising:

a supporting structure which holds the layer of insulating material in the pressure chamber; wherein:

the pressure-equalizing means are formed by the supporting structure; and said filter is arranged between said supporting structure and the surface of said layer of insulating material.

8. The insulation system of claim 7, wherein:

the supporting structure contains a plurality of holes enabling the insulating material to be exposed to a pressure-equalizing gas flow.

9. The insulation system of claim 8, wherein:

the supporting structure comprises at least one perforated sheet.

10. The insulation system of claim 6, further comprising:

a supporting structure which holds the layer of insulating material in the pressure chamber; and a flexible intermediate layer to compensate for expansion, and arranged between the layer of insulating material and the supporting structure.

11. The insulation system of claim 10, wherein:

the flexible intermediate layer is formed by a ceramic felt.

12. The insulation system of claim 5, wherein the pressure-equalizing means comprises:

a structure containing a plurality of holes for feeding the pressure-equalizing gas flow to the layer of insulating material.

13. The insulation system of claim 12, wherein the structure comprises:

at least one perforated sheet.

14. The insulation system of claim 12, wherein:

the structure is a supporting structure for holding the layer of insulating material, and is arranged facing towards the internal chamber.

15. The insulation system of claim 14, wherein the supporting structure comprises:

a gas-tight jacket for the layer of insulating material.

16. The insulation system of claim 14, wherein the supporting structure comprises:

expansion-compensating means for compensating for heat expansion.

17. The insulation system of claim 16, wherein:

the expansion-compensating means comprise compensating bellows.

18. The insulation system of claim 16, wherein:

the expansion-compensating means comprise pleats.

19. The insulation system of claim 12, wherein the pressure-equalizing means comprise:

a flow channel for feeding the pressure-equalizing gas flow to the structure and away from the structure.

20. The insulation system of claim 1, wherein:

the pressure-equalizing means comprises a structure containing a plurality of holes for feeding the pressure-equalizing gas flow to the layer of insulating material; and the filter is made of at least one material selected from the group of paper and plastic.

21. The insulation system of claim 1, wherein:

the pressure-equalizing means are arranged relative to a surface of the layer of insulating material that faces away from the inner surface of the outer jacket of the pressure chamber; and the filter is made of at least one material selected from the group of metal and ceramic.

22. The insulation system of claim 1, wherein:

the at least one layer of insulating material comprises a microporous material.

23. The insulation system of claim 22, further comprising:

fibre mats between which the microporous material is arranged.

24. The insulation system of claim 15, wherein:

the pressure-equalizing means are connected to an outlet passage of the gas flow to which the pressure chamber is exposed.

25. The insulation system of claim 24, wherein:

the filter is arranged at a connection between the pressure-equalizing means and the outlet passage of the gas flow.

26. The insulation system of claim 24, wherein:

an inlet passage of the gas flow into the pressure chamber has one or more branches for a part-flow of the gas flow in order to subject the pressure-equalizing means to pressure.

27. The insulation system of claim 1, wherein:

the layer of insulating material is built up from individual insulation modules.

28. The insulation system of claim 27, further comprising:

a cover for a gap where adjacent ones of the insulation modules abut each other.

29. A volumetric radiation receiver comprising the insulation system of claim 1.

30. The receiver of claim 29, wherein:

the receiver is a solar radiation receiver.

31. A method for the internal thermal insulation of a pressure chamber which is subjected to a gas flow, with the insulation system arranged at an inner surface of an outer jacket of the pressure chamber and comprising at least one layer of insulating material, said pressure chamber having an entry window for radiation, comprising the steps of:

passing pressure-equalizing gas flow, for equalizing pressure between the insulation material and an internal chamber, over a surface of the layer of insulating material over a major area; and passing said pressure-equalizing gas flow through a filter serving to retain particles of the layer of insulating material;

wherein a mesh size of said filter is adapted to the particle size in the layer of insulating material.

32. The method of claim 31, wherein:

the pressure-equalizing gas flow is a part-flow of the gas flow to which the pressure chamber is exposed.

33. The method of claim 31, wherein:

a gas flow being drawn off is taken out of the insulation system into an outlet of the pressure chamber for the gas flow to which the pressure chamber is exposed.

34. A method of claim 33, comprising the further step of:

filtering the gas flow being drawn off to retain particles of the insulating material.

35. A thermal insulation system in combination with a pressure chamber that has an entry window for radiation and is subject to pressure by a gas flow, comprising:

at least one layer of insulating material arranged at an inner surface of an outer jacket of the pressure chamber;

a supporting structure used to hold the insulating material in the pressure chamber;

wherein said supporting structure contains a plurality of holes for equalizing pressure between the insulating material and an internal portion of the pressure chamber;

wherein said supporting structure is arranged over a major area relative to a surface of the layer of the insulating material; and a filter to retain particles of the insulating material;

wherein:

said filter is arranged between said supporting structure and the surface of said layer of insulating material.

36. The system of claim 35, further comprising:

a flexible intermediate layer arranged between the layer of insulating material and the supporting structure to prevent abrasion of the surface of said layer of insulating material.

37. The insulation system of claim 35, wherein:

the supporting structure comprises at least one perforated surface.

38. The insulation system of claim 35, wherein:

a mesh size of said filter is adapted to a particle size in the insulating material.

* * * * *